United States Patent Office 2,743,789
Patented May 1, 1956

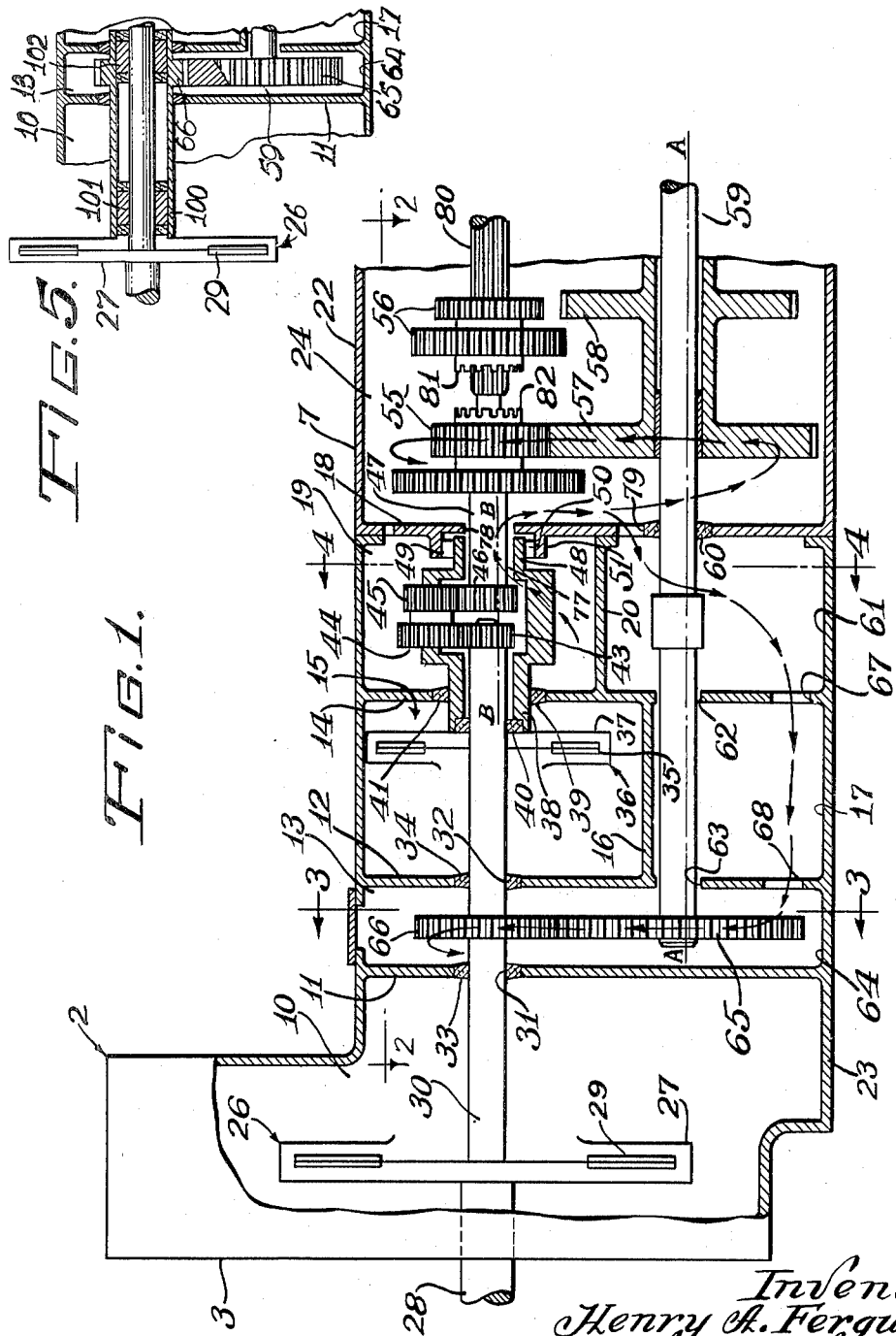
Inventors:
Henry A. Ferguson
Ralph C. Boyle
Joseph F. Ziskal

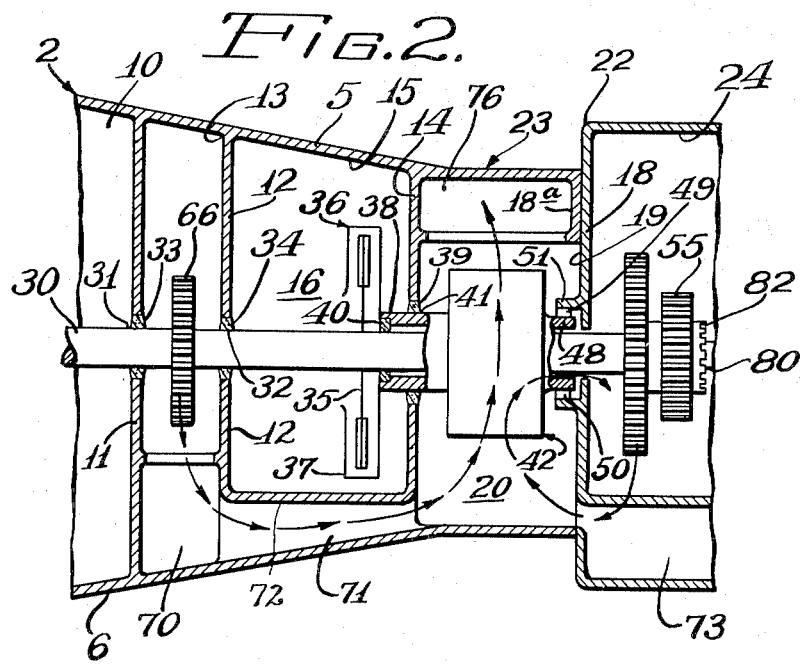

2,743,789

LUBRICATION SYSTEM FOR TRACTOR CHANGE-SPEED GEAR TRANSMISSION

Henry A. Ferguson, Lombard, Ralph C. Boyle, Chicago, and Joseph F. Ziskal, Brookfield, Ill., assignors to International Harvester Company, a corporation of New Jersey Application August 13, 1953, Serial No. 373,946

20 Claims. (Cl. 184—11)

This invention relates to a novel lubrication system for the change-speed transmission system of a tractor.

A general object of the invention is to devise a novel arrangement for channelling lubricating oils into several separated gear sets wherein the gears are employed to discharge oil onto the enclosing housing walls which are provided with channels and passages for circulating the oil to the various gear sets.

A more specific object of the invention is to devise such an oiling system for lubricating several gear sets of a power transmission system of a tractor wherein the transmission system incorporates several clutch devices among the gear sets which must be kept dry.

A still further object is to devise such a novel compartmental oiling system which is adaptable for incorporation in a conventional farm tractor design.

These and other objects of the invention will become more apparent from the specification and the drawings wherein:

Figure 1 is a fragmentary longitudinal vertical sectional view of the longitudinal housing of a tractor with the novel gear set and oiling system incorporated therein;

Figure 2 is a horizontal sectional view taken substantially on the line 2—2 of Figure 1;

Figure 3 is a transverse vertical sectional view taken substantially on the line 3—3 of Figure 1;

Figure 4 is a further transverse sectional view taken substantially on the line 4—4 of Figure 1; and Figure 5 is a fragmentary view comparable to Figure 1 and illustrating a modification of the invention.

Describing the invention in detail, the housing, generally designated 2, extends generally longitudinally of the tractor and comprises a forward end 3, adapted for connection to the tractor engine (not shown), the housing being of tubular form and comprising a bottom generally semi-cylindrical wall 4 which at opposite ends is joined to upstanding side wall 5 and 6, the upper ends of which are interconnected by an integral top wall 7. The housing is provided with a forward main clutch compartment 10 which has a rear terminus comprising a bulkhead member 11 in the form of a vertical wall formed integral with the interior of the housing side and top and bottom walls. Rearwardly of the wall 11 is provided another bulkhead 12 which is spaced axially of the housing 2 and formed integral with the walls thereof and defining with the wall 11 a first or power take-off gear containing compartment 13. Rearwardly of the wall 12 is provided another wall 14 integral with the walls of the housing and defining with the wall 12 a torque amplifier clutch compartment 15 which has a lower terminus in the form of a wall 16 extending generally horizontally intermediate the top and bottom of the housing and formed integral with the walls 12 and 14 and the side walls 5 and 6 of the housing. The wall 16 extends generally horizontally and with the wall portions 12 and 14 therebelow which extend to the bottom wall portion 4 of the housing and integral therewith form an oil sump compartment or passage means 17. Rearwardly of the wall 14 is a further wall 18 which is formed integral with the top and bottom and side walls of the housing and spaced longitudinally of the housing rearwardly of wall 14 and defining with said walls a torque amplifier compartment 19 at its upper end, the space between the walls 14 and 18 being divided by a generally horizontal wall 20 which extends between the walls 14 and 18 and preferably formed integral with the wall 14 and the side walls of the housing. The wall 18 may constitute the forward part of the rear portion 22 of the housing 2 connected to the forward portion 23 of the housing in any conventional manner, the separation being desirable for assembly and disassembly purposes. The connection between these housing portions is not shown; however, any standard securement, such as bolt and nut assemblies passing through lugs projected from the outer periphery of the housing portions, would suffice. The housing portion 22 conforms to the configuration of the forward housing portion 23 and is closed at its rear end (not shown) which will be readily understood by those skilled in the art and provides the main change-speed transmission compartment 24.

The main clutch compartment 10 contains the master engine clutch, generally designated 26, and comprising a driving part 27 which is connected to an engine or drive shaft 28, the driving part cooperating with a driven clutch part disk 29 which has a suitable connection with a driven shaft 30, said driven shaft passing through a pair of aligned apertures 31 and 32 in the walls 11 and 12 adjacent to their upper ends, the apertures 31 and 32 being provided with suitable seals 33 and 34, respectively, to prevent any oil escaping from compartment 13 to compartment 10 or to compartment 15 through which the shaft 30 passes, the shaft 30 has an operative driving connection with a torque amplifier clutch 36 through a driving part 35 of a torque amplifier clutch cooperating with a driven part 37 which is connected to a carrier 38 which with the shaft 30 passes through an aperture 39 in the upper part of the bulkhead 14 aligned with apertures 31 and 32, said carrier being provided with a seal 40 about the shaft 30 and a seal 41 being provided about the carrier within the aperture 39 to prevent any lubricating fluid from leaking from the torque amplifier compartment 19 containing the torque amplifier or gear train 42 to compartment 15.

The carrier 38 and the shaft 30 extend into the compartment 19 and the shaft 30 is provided with a sun gear 43 which meshes with pinions 44 rotatably carried by the carrier 38. The carrier 38 carries a plurality of pinions 45 coaxially and integral with the pinions 44, but of smaller diameter than said pinions 44 and the pinions 45 mesh with a sun gear 46 which is of larger diameter than the sun gear 43, the gear 46 being connected to and constrained for rotation with an output shaft 47 which passes through the carrier hub 48 which is operably associated with a one-way clutch 49 including rollers 50 operative between a circumscribing annulus on the carrier hub 48 and inclined surfaces 51 provided on the wall 18. The shaft 47 carries a plurality of change-speed gears 55, 56 which are formed and arranged to mesh with companion gears 57, 58 which are shiftable into selected matting position with the series of gears 55, 56, etc., in the usual manner, as by a shifting lever (not shown), the gears 57, 58 being rotatably mounted on a countershaft 59 which forwardly of the change-speed gear train extends through a sealed aperture 60 in the wall 18 adjacent to the lower end thereof below the wall 20 and into the sump compartment 61 which is formed between the lower portions of the walls 14 and 18 below the wall 20. The countershaft in the present instance constitutes the power take-off shaft and passes through aligned apertures 62, 63 in the lower portions of the walls 14 and 12 immediately below the wall 16 through the sump chamber 17 and the forward end of the shaft 59 terminates within the compartment 13 and is provided with a gear 65 extending into the sump portion 64 at the lower end of compartment 13 and gear 65 meshes with a gear 66 connected to the shaft 30 for driving the countershaft 59. It will be noted that the gear 66 has its upper edge adjacent to the top wall of the housing and that the gears 55 and 56 are similarly positioned.

It will be noted from a consideration of Figure 1 that the sump chamber 61 and 17, as well as the lower end 64 of the chamber 13 are interconnected by transverse holes or openings 67, 68 in the lower ends of the walls 14 and 12, respectively.

The oil level in the sump chamber 61, 17, and 64 is indicated by the line A—A (Figure 1).

In operation, the gear 65 in the oil bath carries the oil to the upper gear 66 which, rotating at a relatively faster speed and in the direction shown by the arrow in Figure 3, slings the oil from its underside against or toward the wall portion 6 of the housing which is provided with an upwardly open trough 70 extending inwardly from the wall 6 and disposed at a level in intercepting relationship to the oil discharging from the gear 66. The trough communicates with a gallery 71 which extends rearwardly of the trough, the trough being formed integral and part of the walls 11 and 12 and 6, as best seen in Figures 2 and 3, and the gallery being defined by an upright wall 72 (Figure 4) extending and integral with the top wall 7 of the housing and the wall 16 and spaced inwardly of the wall 6 of the housing and providing a passage around the dry compartment 15. The rear end of the gallery or passageway communicates with the chamber 19.

Similarly, the housing portion 22 is provided on a side wall thereof with a trough or shelf, or passageway, 73 which is closed at its rear end as fragmentarily shown in Figure 2 and which at its forward end communicates with the chamber 19.

In operation, the oil which is deposited into the trough 70 will flow through the gallery 71 rearwardly into the compartment 19 and similarly, the oil in the lower sump portion of the compartment 24 is carried by the gears 57, 58 and the mating gear 55, 56 through a slinging action into the shelf or trough 73 which also funnels or channels the oil forwardly into the compartment 19 which forms the principal oil receiver which is located between the two delivery stations.

The oil which flows into the chamber 19 may reach a maximum level, indicated by the line B—B of Figures 1 and 4, and then runs over a dam 75 which is formed integral with the walls 14, 18, and 20, upstanding from the latter and extending between the two former and the upper end of the wall 75, is at a level approximating a point below the center line of the coaxial shafts 30 and 47. It will be seen that the walls 18a, 14, and 75 and the opposed wall 5 of the housing provide an oil overflow channel 76 in the housing whereby the oil is caused to cascade downwardly into the sump chamber 61.

A part of the oil contained in the reservoir or chamber 19 will escape through the carrier in the spaces indicated at 77 and through an opening 78 in the wall 18 and return to the chamber 24. It will be noted in a consideration of Figure 1 that the wall 18 is provided immediately below the wall 20 that is just below the center line of the housing with an overflow opening 79 which permits part of the oil to flow along the wall 18 to re-enter the chamber 61. The position of the opening 79 is at a height sufficient to prevent an undue amount of oil from draining either forwardly or rearwardly of the baffle 18 when the tractor is moving upwardly or downwardly on a grade or if it should fall into a hole and thus the arrangement functions as an oil level equalizer.

It will be noted that the novel arrangement herein presented effectively lubricates all of the gear trains which are separated from each other without the necessity for using special pressure system or the like and that an equalization of the flow of the oil is substantially established.

The change-speed transmission may comprise a tail shaft 80 piloted in gear 55 and spline connected to gears 56, 56 and one gear 56 may have a jaw clutch 81 cooperative with clutch 82 on gear 55 for direct drive of shaft 80.

Figure 5 illustrates the invention in conjunction with a continuous running power take-off and parts identical with those of the first embodiment are marked with the same reference numeral.

In the present embodiment the clutch member 26 which is part of the fly-wheel is connected through a sleeve 100 to the gear 66 and the sleeve projects through the gaskets or seals 33 and 34 and is journalled on the shaft 30 through sealed bearings 101 and 102.

We claim:

1. In a transmission oiling system for a tractor comprising a longitudinal tubular housing, a plurality of transverse bulkheads within and spaced longitudinally of said housing and connected thereto and defining a plurality of compartments therein, power transmitting means in each compartment and comprising shaft means operatively interconnecting the same and extending through aligned apertures in the upper sections of said bulkheads, a countershaft extending through aligned apertures in said bulkheads at a level below said shaft means, meshing gear means on said shaft means and said countershaft in remotely disposed compartments, each compartment having a lower portion containing lubricant to a predetermined level, the intervening compartments between said remote compartments having apertures in the lower portions thereof affording communication therebetween and communicating with one of said remote compartments through an aperture in the lower portion of the bulkhead of said one remote compartment, said other remote compartment having a lubricant passage through the bulkhead separating it from the next adjacent compartment at a height above said predetermined level to prevent excessive transfer of all of the lubricant from one end of the housing to the other when the tractor is inclined to the horizontal, but accommodating transfer of lubricant between said one and communicating compartment, and said other compartments when the lubricant level exceeds a predetermined maximum.

2. In an oiling system according to claim 1 and said gears on said countershaft extending into the lubricant and transferring the same to the associated meshing gears on said shaft means.

3. An oiling system according to claim 2 and at least one of said intervening compartments having a wall interconnecting the bulkheads thereof intermediate their upper and lower ends and subdividing the same into upper and lower portions, a gear train within said upper portion operatively associated with said shaft means, a gallery along one side of said housing communicating with said upper portion and at least one of said remote compartments, and means for receiving splash lubricant deposits from the adjacent gear means on said shaft means whereby lubricant is channelled to said upper portion.

4. An oiling system according to claim 3 and said wall terminating in an edge short of the opposite side of said housing, and a dam upstanding from said edge to a level above the bottom of said gear train and connected to the adjacent bulkheads, said dam, adjacent bulkhead and opposed portion of the housing defining a channel communicating with said upper and lower portions along the side of said housing opposite said side having said gallery.

5. A lubricating system for a tractor comprising a housing, a power transmission therewithin, means supporting said transmission within said housing, said transmission comprising a plurality of gear sets spaced longitudinally of the housing, means constituting an oil containing sump at the bottom of said housing, and a bulkhead formed in said housing between said gear sets and dividing the housing into compartments, said bulkhead provided with a passage at a height above a predetermined level of oil in said sump to permit oil above said level to flow from one compartment to the other upon the tractor being inclined without entirely depleting either compartment during such condition, and said gear sets each having at least one gear moving through said oil sump for transferring the oil to the other portions of the gear set, and said transmission incorporating a further gear train intermediate said gear sets at a level above said oil sump, a container in the housing below said gear train cupping a portion thereof, and trough means on said housing communicating with said container and with said compartments and having collecting means disposed in receiving relation to oil splashings from said gear sets for delivering it to said container.

6. In a system according to claim 5 and said gear train providing an oil outlet through said bulkhead into one of said compartments and said container having a side spaced from an opposed portion of the housing and affording a passage therewith for said oil from said container to said sump.

7. In a transmission lubricating system for a tractor of the type comprising a longitudinal waist in the form of a housing and having a transmission therein including a main clutch at its forward end, a change-speed gearing at its rear end, a torque amplifier with an operating clutch intermediate its ends, and a power-take-off gearing intermediate said main clutch and said torque amplifier clutch, the improvement comprising: a series of bulkheads connected to said housing and subdividing it into a main clutch containing compartment, a torque amplifier clutch containing compartment, a torque amplifier containing compartment, a change-speed gearing containing compartment, and a power-take-off gearing containing compartment, means sealing said clutch compartments from the entry of lubricant therein, passage means in said bulkheads and said housing affording lubricant communication between said power-take-off gearing containing compartment and said change-speed gearing containing compartment and having passageways disposed beneath said torque amplifier and torque amplifier clutch compartments, a gallery formed between one side of the housing and said torque amplifier clutch containing compartment and communicating with said power-take-off gearing containing compartment and said torque amplifier containing compartment, a lubricant in the lower portion of said power-take-off gearing containing compartment for bathing a portion of said gearing therein, said power-take-off gearing formed and arranged to sling lubricant therefrom into said gallery and said gallery formed and arranged to transfer said lubricant to said torque amplifier gearing containing compartment.

8. The combination according to claim 7 and said change-speed gearing containing compartment having lubricant in the lower portion thereof extending to a level to bathe a portion of the gearing therein, passage means formed on one wall of said housing and communicating with said torque amplifier containing compartment and said change-speed containing compartment, and said change-speed gearing formed and arranged to sling lubricant into said passage means.

9. The combination according to claim 8 and means on said housing forming a lubricant overflow channel from said torque amplifier gearing containing compartment to said first-mentioned passage means.

10. The combination according to claim 9 and said torque amplifier gearing having passages therethrough open through the bulkhead separating said torque amplifier gearing containing compartment from said change-speed gearing containing compartment to transfer lubricant from the former to the latter, and said first-mentioned passage means incorporating a passage in said last-mentioned bulkhead below said torque amplifier gear- ing containing compartment and at a level intermediate the top and bottom of the change-speed gearing containing compartment.

11. In a transmission lubricating system for a vehicle having a fore and aft extending housing with a plurality of spaced bulkheads therein subdividing said housing to provide forward, rear and intermediate compartments, and a transmission in said housing incorporating a shaft assembly passing through said bulkheads adjacent to the upper ends thereof, and countershaft means passing through said bulkheads adjacent to their lower ends, and meshing gear means on said shaft assembly and countershaft means in said forward and rear compartments and a gear train associated with said shaft means in the upper portion of said intermediate compartment, a lubricant in the lower portions of said compartments and having an upper level below said gear train, passage means on said housing in the upper portion thereof and having intake means disposed in said forward and rear compartments and having discharge means adjacent to said gear train, means for delivering lubricant from said discharge means to said gear train each gear means comprising a gear on the countershaft disposed to bathe in the lubricant and in lubricant-transferring relationship to a gear on the shaft assembly and said gear on the shaft assembly disposed to sling said lubricant to the adjacent intake means, at least one of said gear means delivering lubricant to its respective intake means irrespective of the fore and aft inclination of said housing.

12. The invention according to claim 11 and further characterized in that said shaft assembly has a continuously running part and said gear means in said forward compartment are driven thereby whereby continuously discharging lubricant to its associated intake means.

13. The combination according to claim 11 and said bulkhead between said intermediate and forward compartments having communicating passages adjacent to the bottom thereof, and said bulkhead between said intermediate and rear chamber having a communicating passage therethrough at a level above the normal level of said lubricant.

14. The combination according to claim 13 and said gear train having a seepage passage through said last-mentioned bulkhead disposed in at least partial draining relation to said last-mentioned passage.

15. The combination according to claim 14 and said means for delivering said lubricant from said discharge means to said gear train comprising a trough beneath said gear train connected to the adjacent bulkheads and communicating with said discharge means at one side and spaced from the housing at its opposite side and defining a channel therewith to the lower portion of said intermediate chamber.

16. For a vehicle having an elongated generally horizontal housing with a plurality of bulkheads therein subdividing said housing into a plurality of compartments, and a transmission mounted in said housing and including gear means disposed in separate remote and compartments spaced longitudinally of said housing and having a further gear train in an upper portion of an intervening compartment positioned between said separate compartments, lubricant conduit means associated with the upper portion of said housing and extending lengthwise thereof and having one inlet communicating with one of said separate remote compartments and having a second inlet communicating with the other of said separate remote compartments and having outlet means intermediate said inlets, and means disposed in lubricant-transferring relationship from said outlet means to said gear train in said intervening compartment, a lubricant in the lower portions of said compartments below the level of said gear train, each said gear means extending into the lubricant in the lower portion of its associated compartment and formed and arranged to discharge the lubricant to the inlet means of said lubricant conduit means at the upper portion of the related compartment.

17. In a lubrication system, a normally generally horizontally disposed housing with a plurality of bulkheads therein subdividing said housing into horizontally separated end and intermediate compartments, each providing an oil sump in the lower portion thereof, means partitioning the intermediate of said compartments vertically and disposed at a level above said lower portion thereof, and providing a gear cupping lubricant container, and lubricant conduit means on the upper portion of said housing and extending between said end compartments and having one lubricant inlet communicating with one of said end compartments and having a second lubricant inlet communicating with the other of said end compartments and having structure including outlet means communicating with said lubricant container.

18. In a transmission lubrication system, a normally horizontally disposed housing having a plurality of generally vertical bulkheads subdividing said housing into remote and intermediate compartments, each having a lower portion providing an oil sump for containing a lubricant, a cup-like gear trough partitioning the intermediate of said compartments into upper and lower portions, a gallery formed integral with a side of the housing at the upper portion thereof and extending from one of said remote compartments to said intermediate compartment and having lubricant-receiving inlet means communicating with said one remote compartment and having lubricant outlet means communicating with said trough, and lubricant passage means formed integral with a side of said housing at the upper portion thereof and having lubricant inlet means communicating with the other of said remote compartments and having lubricant outlet means communicating with said trough.

19. In a transmission lubrication system, a generally horizontal transmission housing having spaced remote compartments and an intermediate compartment, said compartments providing a lubricant sump in the lower portions thereof, said intermediate compartment having a transmission cupping lubricant-receiving structure in the upper portion thereof above the level of said lubricant sump, lubricant conduit means at the upper portion of the housing having lubricant-receiving inlet means communicating with the upper portions of respective remote compartments and having lubricant outlet means communicating with said structure, said structure incorporating a dam member spaced from and opposing a side of said housing and defining a lubricant discharge channel therewith leading from said structure in the upper portion of said intermediate compartment to said sump in the lower portion of the intermediate compartment.

20. The invention according to claim 19, and further characterized by said housing having an upright bulkhead between one of said remote compartments and said intermediate compartment and defining a side of said lubricant receiving structure, and said bulkhead having a lubricant passage leading from said structure and to said one remote compartment, and said dam member having an upper edge disposed above the level of said passage to drain the overflow of lubricant from said structure above the level of said passage.

References Cited in the file of this patent
UNITED STATES PATENTS

| | | |
|---|---|---|
| 1,559,617 | Johnston | Nov. 3, 1925 |
| 1,858,533 | White | May 17, 1932 |
| 2,027,012 | Barnes | Jan. 7, 1936 |